United States Patent
Kang (10) Patent No.: US 11,226,516 B2
(45) Date of Patent: Jan. 18, 2022

(54) OPTICAL COMPOSITE FILM, DISPLAY PANEL, AND DISPLAY DEVICE

(71) Applicants: HKC Corporation Limited, Guangdong (CN); Chongqing HKC Optoelectronics Technology Co., Ltd., Chongqing (CN)

(72) Inventor: Chih Tsung Kang, Chongqing (CN)

(73) Assignees: HKC Corporation Limited, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 17/041,078

(22) PCT Filed: Nov. 29, 2018

(86) PCT No.: PCT/CN2018/118104
§ 371 (c)(1),
(2) Date: Sep. 24, 2020

(87) PCT Pub. No.: WO2020/087620
PCT Pub. Date: May 7, 2020

(65) Prior Publication Data
US 2021/0096410 A1    Apr. 1, 2021

(30) Foreign Application Priority Data
Oct. 30, 2018  (CN) .......................... 201811278704.X (51) Int. Cl.
*G02F 1/13363*  (2006.01)
*G02F 1/1335*  (2006.01)

(52) U.S. Cl.
CPC .... *G02F 1/13363* (2013.01); *G02F 1/133528* (2013.01); *G02F 1/133553* (2013.01)

(58) Field of Classification Search
CPC ......... G02F 1/133633; G02F 1/133528; G02F 1/133553; G02B 5/3083; G02B 6/0053; G02B 6/0001
See application file for complete search history.

(56) References Cited

U.S. PATENT DOCUMENTS

2008/0036954 A1   2/2008 Takahashi et al.
2012/0307191 A1  12/2012 Park et al.
(Continued)

FOREIGN PATENT DOCUMENTS

| CN | 1950745 A | 4/2007 |
| CN | 102809846 A | 12/2012 |

(Continued)

OTHER PUBLICATIONS

International Search Report for Application No. PCT/CN2018/118104 dated Jul. 22, 2019, 4 pages.
(Continued)

*Primary Examiner* — Jessica M Merlin
(74) *Attorney, Agent, or Firm* — Seyfarth Shaw LLP (57) ABSTRACT

An optical composite film, comprising a uniaxial optical film layer, a substrate layer, and a reflective raster film layer. The uniaxial optical film layer comprises a plate-like portion and multiple refractive portions provided at one side of the plate-like portion. The multiple refractive portions are selected one of arc-shaped columns and quadrangular prisms. The material of the uniaxial optical film layer is a disc-like liquid crystal molecule material. The substrate layer is stacked at one side of the plate-like portion close to the refractive portion. The multiple refractive portions are accommodated in the substrate layer. The ordinary refractive index of the uniaxial optical film layer is greater than the refractive index of the substrate layer. The reflective raster (Continued)

film layer is provided at one side of the substrate layer distant from the uniaxial optical film layer.

20 Claims, 9 Drawing Sheets

(56) References Cited

U.S. PATENT DOCUMENTS

| | | | |
|---|---|---|---|
| 2014/0353618 A1 | 12/2014 | Shim et al. | |
| 2017/0038519 A1 | 2/2017 | Kim et al. | |
| 2018/0045876 A1* | 2/2018 | Lee | G02B 6/0053 |
| 2018/0267358 A1* | 9/2018 | Choi | G02F 1/136286 |

FOREIGN PATENT DOCUMENTS

| | | |
|---|---|---|
| CN | 107111189 A | 8/2017 |
| CN | 107533180 A | 1/2018 |
| CN | 108630103 A | 10/2018 |
| KR | 20170057087 A | 5/2017 |

OTHER PUBLICATIONS

Chinese Office Action for Application No. 201811278704.X dated Oct. 12, 2019, 8 pages.
Chinese Office Action for Application No. 201811278704.X dated Jun. 29, 2020, 6 pages.

* cited by examiner

OPTICAL COMPOSITE FILM, DISPLAY PANEL, AND DISPLAY DEVICE

CROSS REFERENCE TO RELATED APPLICATIONS

This is a U.S. National Stage application of, and claims priority to, PCT/CN2018/118104, filed Nov. 29, 2018, which further claims priority to Chinese Patent Application No. 201811278704.X, filed Oct. 30, 2018, the disclosures of which are incorporated herein by reference in their entirety.

TECHNICAL FIELD

This application relates to the field of display technologies, and more particularly relates to an optical composite film, a display panel, and a display device.

BACKGROUND

Exemplary large-sized liquid crystal display (LCD) panels include a vertical alignment (VA) liquid crystal panel, an in-plane switching (IPS) liquid crystal panel, and the like. Compared with the IPS liquid crystal panel, the VA liquid crystal panel has advantage of relatively high production efficiency and low manufacturing costs, but has relatively obvious defects in optical properties. Particularly, a large-sized panel requires a relatively large viewing angle for presentation in commercial application, and at a large viewing angle, the brightness of the VA liquid crystal panel is rapidly saturated along with the voltage. As a result, the picture quality contrast and the color shift at the large viewing angle are deteriorated severely compared with the picture quality of a front viewing angle, and a color shift problem is generated.

In addition, an architecture of an exemplary LCD display panel is usually a stacking structure. To be specific, polarizing plates are attached on and under a liquid crystal layer. However, a single-layered thickness of a current polarizing plate is approximately 200 μm, and the upper and lower polarizing plates need to be 400 μm in total thickness. As a result, the liquid crystal display panel is relatively thick.

SUMMARY

This application provides an optical composite film that can improve color shift of a display panel at a large viewing angle and make the display panel relatively thin.

Moreover, a display panel and a display device are further provided.

An optical composite film comprises:

an optically-uniaxial optical film layer, comprising a plate-shaped portion and a plurality of refraction portions disposed on a side of the plate-shaped portion, wherein the plurality of refraction portions are selected from one type of camber columns and quadrangular prisms, and when the plurality of refraction portions are the camber columns, the refraction portion has a plurality of side surfaces, one of the plurality of side surfaces is an arc-shaped convex surface, and a side surface of the refraction portion away from the arc-shaped convex surface is in contact with the plate-shaped portion; and when the plurality of refraction portions are the quadrangular prisms, a side surface of the refraction portion is in contact with the plate-shaped portion, wherein a material of the optically-uniaxial optical film layer is a dish-shaped liquid crystal molecule material;

a substrate layer, stacked on a side of the plate-shaped portion close to the refraction portion, wherein the plurality of refraction portions are accommodated in the substrate layer, and an ordinary light refractive index of the optically-uniaxial optical film layer is greater than a refractive index of the substrate layer; and a reflection grating film layer, disposed on a side of the substrate layer away from the optically-uniaxial optical film layer.

In an embodiment, the substrate layer is a transparent optical film layer having optical isotropy.

In an embodiment, the substrate layer is selected from one of the group consisting of a polymethylmethacrylate layer, a polyethylene terephthalate layer, a cyclic olefin polymer layer, a cellulose triacetate film, a polyimide film, a silicon dioxide layer, a silicon nitride layer, and a glass plate layer.

In an embodiment, the ordinary light refractive index of the optically-uniaxial optical film layer is 1.0 to 2.5.

In an embodiment, the refractive index of the substrate layer is 1.0 to 2.5.

In an embodiment, a difference between the ordinary light refractive index of the optically-uniaxial optical film layer and the refractive index of the substrate layer is 0.01 to 2.

In an embodiment, the plurality of refraction portions are the camber columns, the plurality of refraction portions are arranged along a straight line, and extension directions of the plurality of refraction portions are parallel.

In an embodiment, the plurality of refraction portions are the camber columns, the plurality of refraction portions are arranged in a two-dimensional matrix, and two neighboring refraction portions are disposed at an interval.

In an embodiment, the plurality of refraction portions are the quadrangular prisms, the plurality of refraction portions are arranged along a straight line, extension directions of the plurality of refraction portions are parallel, and two neighboring refraction portions are disposed at an interval.

In an embodiment, the plurality of refraction portions are the quadrangular prisms, the plurality of refraction portions are arranged in a two-dimensional matrix, and two neighboring refraction portions are disposed at an interval.

In an embodiment, the reflection grating film layer comprises a transparent substrate and a plurality of strip-shaped metal layers disposed on the transparent substrate, the plurality of metal layers are evenly arranged at intervals along a straight line, and extension directions of the plurality of metal layers are parallel to each other.

In an embodiment, a material of the optically-uniaxial optical film layer is a dish-shaped liquid crystal molecule material, the ordinary light refractive index of the optically-uniaxial optical film layer is 1.0 to 2.5, the refractive index of the substrate layer is 1.0 to 2.5, and a difference between the ordinary light refractive index of the optically-uniaxial optical film layer and the refractive index of the substrate layer is 0.01 to 2.

A display panel comprises the foregoing optical composite film, a first glass film layer, a first indium tin oxide film layer, a liquid crystal layer, a second indium tin oxide film layer, a metal grating film layer, a second glass film layer, and a photoresist layer, wherein the reflection grating film layer, the first glass film layer, the first indium tin oxide film layer, the liquid crystal layer, the second indium tin oxide film layer, the metal grating film layer, and the second glass film layer are sequentially stacked, and the photoresist layer is stacked between the metal grating film layer and the second glass film layer, or the photoresist layer is stacked between the first glass film layer and the first indium tin oxide film layer.

A display device comprises a backlight source and the foregoing display panel, wherein the backlight source is located on a side of the display panel.

Details of one or more embodiments of this application are provided in the following accompanying drawings and descriptions. Other features, objectives, and advantages of this application will become apparent from the specification, the accompanying drawings, and the claims.

DETAILED DESCRIPTION OF THE EMBODIMENTS

This application provides an optical composite film, a display panel, and a display device. To make objectives, technical solutions, and effects of this application more clear and definite, this application is further described in detail below. It should be understood that specific embodiments described herein are only used to explain this application and are not intended to limit this application.

Explanation of symbols: ">" means greater than; "<" means less than; "=" means equal.

Figure 1:
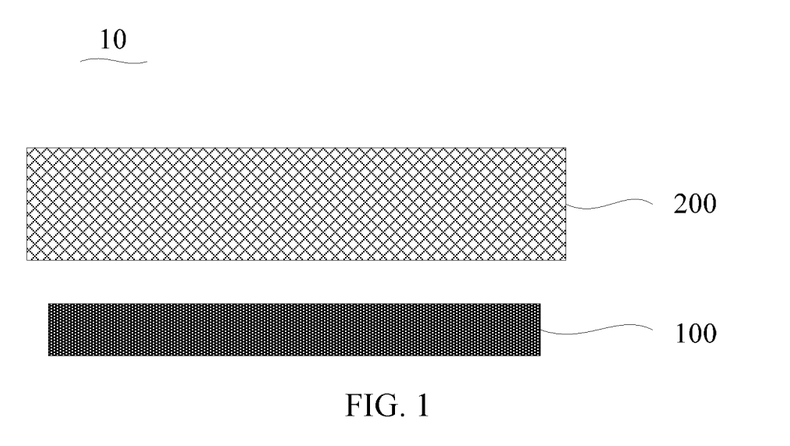
FIG. 1 is a schematic structural diagram of a display device according to an embodiment.

Referring to FIG. 1, a display device 10 of an embodiment includes a backlight source 100 and a display panel 200.

The backlight source 100 is a collimated light emitting backlight (BL) source, so that energy of light is centrally output at a front viewing angle.

Figure 2:
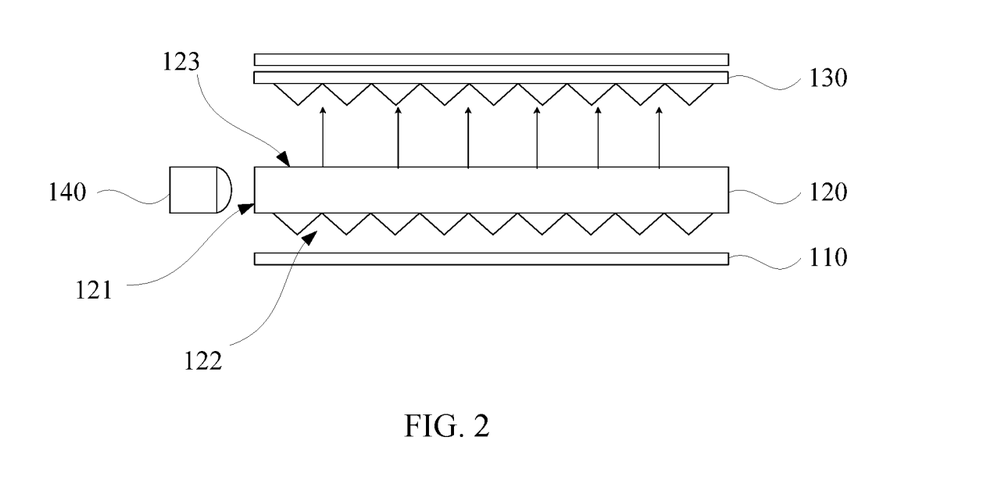
FIG. 2 is a schematic structural diagram of a backlight source of the display device shown in FIG. 1.

Referring to FIG. 2, specifically, the backlight source 100 includes a reflector plate 110, a light guide plate 120, a prism film 130, and a light-emitting diode (LED) light source 140. The reflector plate 110, the light guide plate 120, and the prism film 130 are sequentially stacked, the light guide plate 120 has a light incident surface 121, and the LED light source 140 and the light incident surface 121 are disposed opposite to each other. A side of the light guide plate 120 close to the reflector plate 110 is provided with a strip-shaped first groove 122, the first groove 122 has a V-shaped cross section, and an extension direction of the first groove 122 is perpendicular to a light emitting direction of the LED light source 140. A side of the light guide plate 120 close to the prism film 130 is provided with a strip-shaped second groove 123, the second groove 123 has a V-shaped cross section, and an extension direction of the second groove 123 is parallel to a light emitting direction of the LED light source 140. Optionally, a side of a prism of the prism film 130 is stacked on the light guide plate 120.

Figure 3:
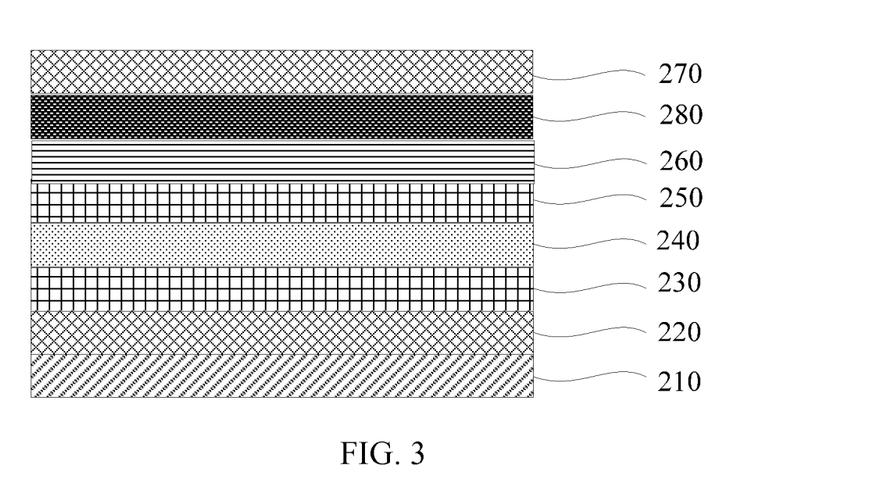
FIG. 3 is a schematic structural diagram of a display panel of the display device shown in FIG. 1.

Referring to FIG. 3, the display panel 200 includes an optical composite film 210, a first glass film layer 220, a first indium tin oxide (ITO) film layer 230, a liquid crystal layer 240, a second indium tin oxide film layer 250, a metal grating film layer 260, a second glass film layer 270, and a photoresist layer 280.

Figure 4:
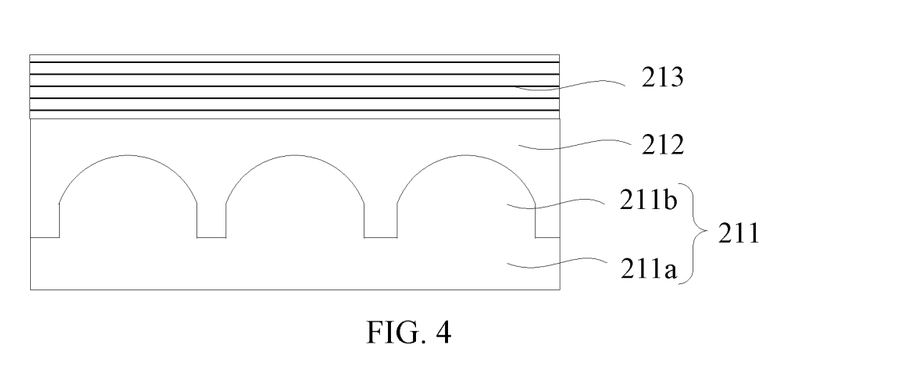
FIG. 4 is a schematic structural diagram of an optical composite film of the display panel shown in FIG. 3.

Referring to FIG. 4, the optical composite film 210 includes an optically-uniaxial optical film layer 211, a substrate layer 212, and a reflection grating film layer 213.

The optically-uniaxial optical film layer 211 has optical anisotropy, and when light passes through the optically-uniaxial optical film layer 211, a birefringence phenomenon is generated. Light entering the optically-uniaxial optical film layer 211 may be equivalent to two beams of light whose light polarization directions are perpendicular to each other, and light whose light polarization direction is perpendicular to a liquid crystal optical axis of the optically-uniaxial optical film layer 211 is referred to as ordinary light, and is briefly referred to as O light; and light whose light polarization direction is parallel to the liquid crystal optical axis of the optically-uniaxial optical film layer 211 is referred to as extraordinary light, and is briefly referred to as E light. Optionally, the extraordinary light refractive index (ne) is an equivalent refractive index when the light polarization direction is parallel to an optical axis of the optically-uniaxial optical film layer 211; and the ordinary light refractive index (no) is an equivalent refractive index when the light polarization direction is perpendicular to the optical axis of the optically-uniaxial optical film layer 211. The extraordinary light refractive index (ne) of the optically-uniaxial optical film layer 211 is less than the ordinary light refractive index (no) of the optically-uniaxial optical film layer 211, that is, ne<no. Specifically, the ordinary light refractive index (no) of the optically-uniaxial optical film layer 211 is 1.0 to 2.5.

In an embodiment, an XYZ three-dimensional coordinate system is constructed, nx is a refractive index of the optically-uniaxial optical film layer 211 in a direction X, ny is a refractive index of the optically-uniaxial optical film layer 211 in a direction Y, nz is a refractive index of the optically-uniaxial optical film layer 211 in a direction Z, the direction Z is an extension direction of the film thickness of the optically-uniaxial optical film layer 211, and the extension direction of the film thickness is perpendicular to a light emitting surface of the optically-uniaxial optical film layer 211. In this case, no=nx=ny, and ne=nz. Specifically, a material of the optically-uniaxial optical film layer 211 is a dish-shaped liquid crystal molecule material. More specifically, a material of the optically-uniaxial optical film layer 211 is a negative dish-shaped liquid crystal molecule material.

Specifically, the optically-uniaxial optical film layer 211 includes a plate-shaped portion 211a and refraction portions 211b.

The plate-shaped portion 211a is of a transparent flat-plate structure.

Figure 5:
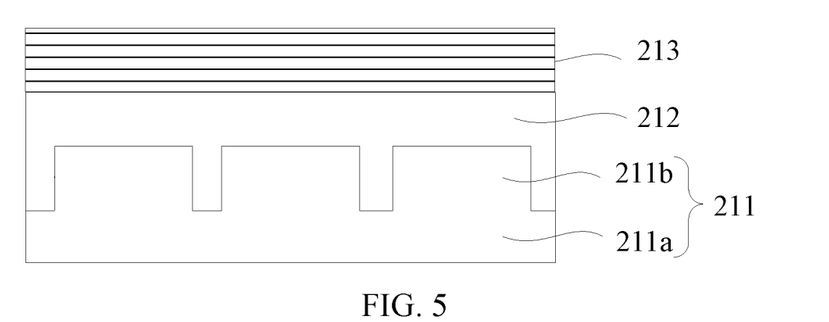
FIG. 5 is a schematic structural diagram of an optical composite film of another embodiment of the display panel shown in FIG. 3.

A plurality of refraction portions 211b exist, and the plurality of refraction portions 211b are disposed on a side of the plate-shaped portion 211a. Referring to FIG. 5, specifically, the plurality of refraction portions 211b are camber columns or quadrangular prisms.

When the plurality of refraction portions 211b are the camber columns, the refraction portion 211b has a plurality of side surfaces, one of the plurality of side surfaces is an arc-shaped convex surface, and a side surface of the refraction portion 211b away from the arc-shaped convex surface is in contact with the plate-shaped portion 211a. Specifically, the arc-shaped convex surface is a curved surface formed when an arc line is moved along an extension direction of the refraction portion 211b. More specifically, the arc line is a circular arc line.

Optionally, the plurality of refraction portions 211b are arranged along a straight line, and extension directions of the plurality of refraction portions 211b are parallel. Two neighboring refraction portions 211b are in contact with each other or are disposed at an interval.

Figure 6:
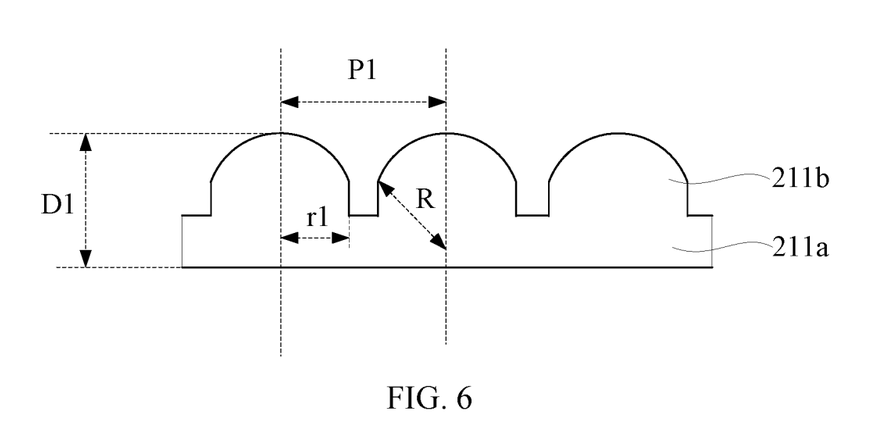
FIG. 6 is a schematic structural diagram of an optically-uniaxial optical film layer in the optical composite film shown in FIG. 4.

Referring to FIG. 6, specifically, the refraction portion 211b has four side surfaces, and two side surfaces connected to the arc-shaped convex surface are parallel, an arc line of the refraction portion 211b is a circular arc line, and a chord corresponding to the arc line of the refraction portion 211b is parallel to a bottom surface close to the plate-shaped portion 211a. A distance between a midpoint of the arc line of the refraction portion 211b and one of two side surfaces is r1, and a distance between midpoints of arc lines of two neighboring refraction portions 211b is P1, where P1≥2r1. When P1>2r1, the two neighboring refraction portions 211b are disposed at an interval; and when P1=2r1, the two neighboring refraction portions 211b are in contact with each other. More specifically, P1≤10 μm, to ensure that at least one arc-shaped convex surface in a sub-pixel enables light to be incident from an optically denser medium to an optically thinner medium and a refraction phenomenon occurs, thereby allocating light energy at a front viewing angle to a large viewing angle.

R is the radius of a circle on which the arc line is located, and D1 is a maximum thickness of the optically-uniaxial optical film layer 211, where R≤D1. A larger curvature of the arc line indicates a larger range of the energy that can be allocated from the front viewing angle to the large viewing angle.

It should be noted that when the plurality of refraction portions 211b are camber columns, the plurality of refraction portions 211b are not limited to being arranged along a straight line, the plurality of refraction portions 211b may alternatively be arranged in a two-dimensional matrix, and two neighboring refraction portions 211b are disposed at an interval, so as to more effectively allocate light energy from the front viewing angle to two-dimensional directions, so that watching at a full viewing angle is more even.

When the plurality of refraction portions 211b are the quadrangular prisms, a side surface of the refraction portion 211b is in contact with the plate-shaped portion 211a.

Optionally, the plurality of refraction portions 211b are arranged along a straight line, extension directions of the plurality of refraction portions 211b are parallel, and two neighboring refraction portions 211b are disposed at an interval.

Figure 7:
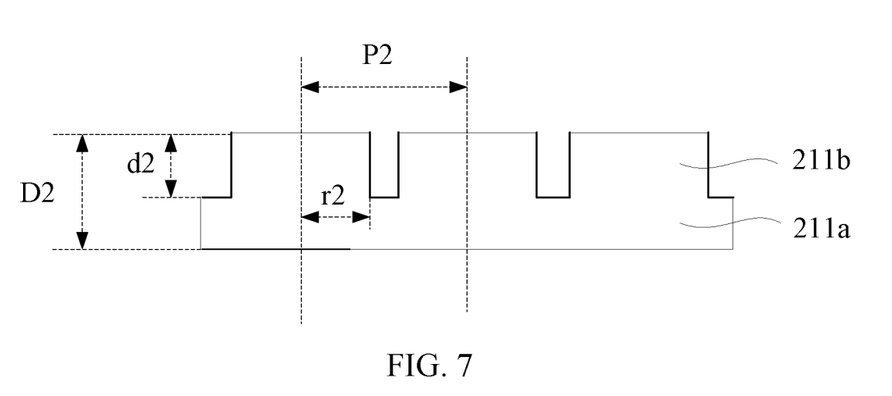
FIG. 7 is a schematic structural diagram of an optically-uniaxial optical film layer in the optical composite film shown in FIG. 5.

Specifically, referring to FIG. 7 together, the plurality of refraction portions 211b are square prisms, a half of the width of a side surface of the refraction portion 211b close to the plate-shaped portion 211a is r2, and a distance between centers of side surfaces of two neighboring prism portions close to the plate-shaped portion 211a is P2, where P2>2r. Optionally, P1≤10 μm, to ensure that at least one arc-shaped convex surface in a sub-pixel enables light to be incident from an optically denser medium to an optically thinner medium and a refraction phenomenon occurs, thereby allocating light energy at a front viewing angle to a large viewing angle. The thickness of the refraction portion 211b is d2, the thickness of the optically-uniaxial optical film layer 211 is D2, and d2 is not equal to 0, where d2≤D2.

Figure 8:
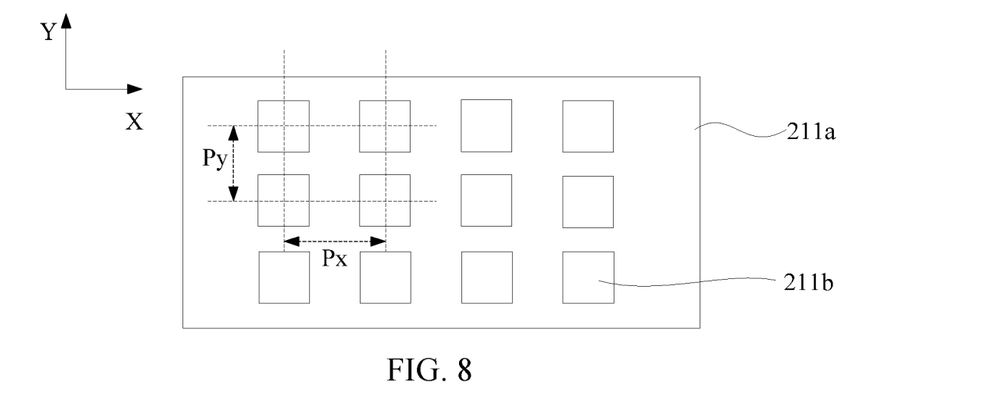
FIG. 8 is a schematic structural diagram of an optically-uniaxial optical film layer of another embodiment of the optical composite film shown in FIG. 5.

It should be noted that referring to FIG. 8 together, when the plurality of refraction portions 211b are square prisms, the plurality of refraction portions 211b are not limited to being arranged along a straight line, the plurality of refraction portions 211b may alternatively be arranged in a two-dimensional matrix, and two neighboring refraction portions 211b are disposed at an interval, so as to more effectively allocate light energy from the front viewing angle to two-dimensional directions, so that watching at a full viewing angle is more even.

Figure 9:
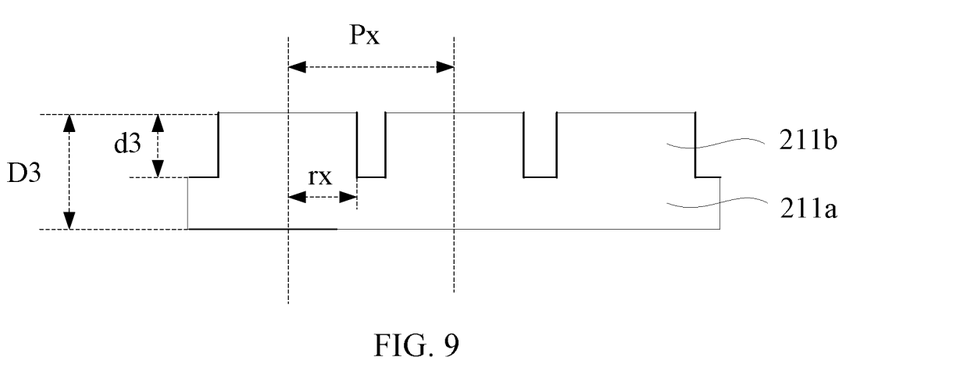
FIG. 9 is a schematic structural diagram of the optically-uniaxial optical film layer, at another angle, shown in FIG. 8.
Figure 10:
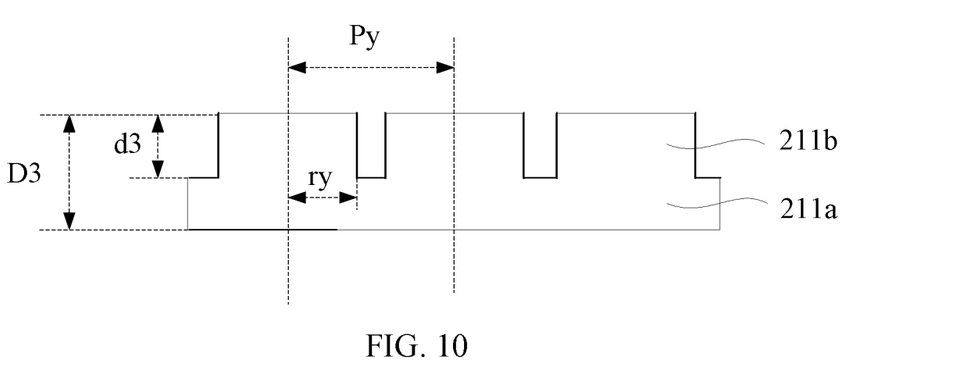
FIG. 10 is a schematic structural diagram of the optically-uniaxial optical film layer, at another angle, shown in FIG. 8.

Referring to FIG. 9 and FIG. 10 together, specifically, the plurality of refraction portions 211b are square prisms, a half of the width of a side surface of the refraction portion 211b close to the plate-shaped portion 211a in a direction X is rx, a half of the width of the side surface of the refraction portion 211b close to the plate-shaped portion 211a in a direction Y is ry, a distance between centers of side surfaces of two neighboring prism portions close to the plate-shaped portion 211a in the direction X is Px, and a distance between the centers of the side surfaces of the two neighboring prism portions close to the plate-shaped portion 211a in the direction Y is Py, where Px=Py, Px>2rx, and Py>2ry. Optionally, Px≤10 μm, and Py≤10 μm, to ensure that at least one arc-shaped convex surface in a sub-pixel enables light to be incident from an optically denser medium to an optically thinner medium and a refraction phenomenon occurs, thereby allocating light energy at a front viewing angle to a large viewing angle. The thickness of the refraction portion 211b is d3, the thickness of the optically-uniaxial optical film layer 211 is D3, and d3 is not equal to 0, where d3≤D3. It should be noted that Px is not limited to being equal to Py, and Px may alternatively be greater than or less than Py.

The substrate layer 212 is stacked on a side of the plate-shaped portion 211a close to the refraction portion 211b, and the plurality of refraction portions 211b are accommodated in the substrate layer 212. The substrate layer 212 is a transparent optical film layer having optical isotropy. The substrate layer 212 is made of an organic transparent material or inorganic transparent material. For example, a material of the substrate layer 212 is a coating material through which a planarization structure is made on the photoresist layer.

Specifically, the substrate layer 212 is selected from one of the group consisting of a polymethylmethacrylate (PMMA) layer, a polyethylene terephthalate (PET) layer, a cyclic olefin polymer (COP) layer, a cellulose triacetate (TAC) film, a polyimide (PI) film, a silicon dioxide layer, a silicon nitride layer, and a glass plate layer. It should be noted that the substrate layer 212 is not limited to the foregoing film layer, and an optical film may be used as the substrate layer provided that the optical film has optical isotropy.

Optionally, an ordinary light refractive index (ns) of the substrate layer 212 is 1.0 to 2.5.

In an embodiment, the ordinary light refractive index (no) of the optically-uniaxial optical film layer 211 is greater than the ordinary light refractive index (ns) of the substrate layer 212. Specifically, a difference between the ordinary light refractive index (no) of the optically-uniaxial optical film layer 211 and the ordinary light refractive index (ns) of the substrate layer 212 is 0.01 to 2. A larger difference between the ordinary light refractive index (no) of the optically-uniaxial optical film layer 211 and the ordinary light refractive index (ns) of the substrate layer 212 indicates easier allocation of light energy from the front viewing angle to the large viewing angle.

The reflection grating film layer 213 is disposed on a side of the substrate layer 212 away from the optically-uniaxial optical film layer 211. The reflection grating film layer 213 can turn natural light into polarized light, and is in place of a polarizing plate, to reduce the thickness of the display panel 200. Optionally, the reflection grating film layer 213 is stacked on a side surface of the substrate layer 212 away from the optically-uniaxial optical film layer 211. The thickness of the reflection grating film layer 213 is usually less than 20 μm. It can be learned that, the thickness of the reflection grating film layer 213 is far less than the thickness of the polarizing plate.

Figure 11:
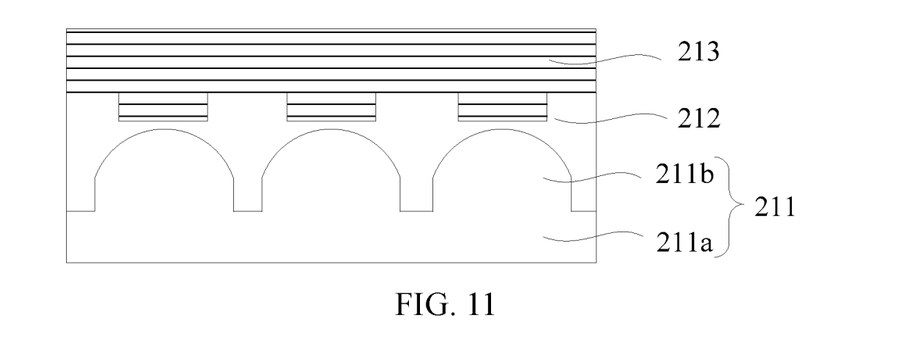
FIG. 11 is a schematic structural diagram of an optical composite film of another embodiment of the display panel shown in FIG. 3.
Figure 12:
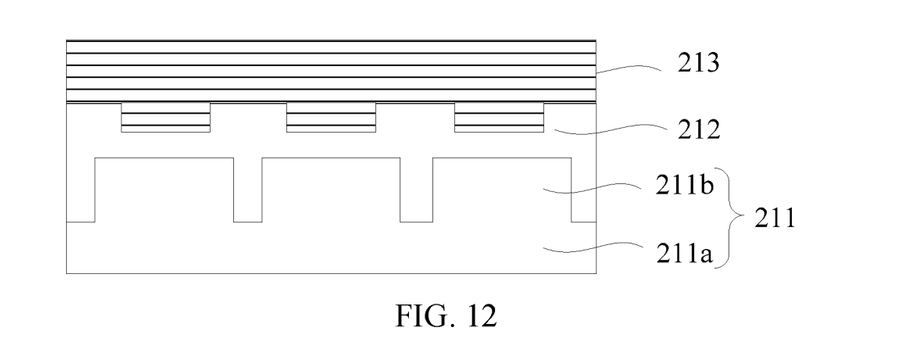
FIG. 12 is a schematic structural diagram of an optical composite film of another embodiment of the display panel shown in FIG. 3.

It should be noted that referring to FIG. 11 and FIG. 12 together, the reflection grating film layer 213 is not limited to being stacked on a side surface of the substrate layer 212 away from the optically-uniaxial optical film layer 211, and a part of the reflection grating film layer 213 may alternatively be inserted into a side of the substrate layer 212 away from the optically-uniaxial optical film layer 211. Optionally, the part of the reflection grating film layer 213 inserted into the substrate layer 212 corresponds to a location of the refraction portion 211b.

Figure 13:
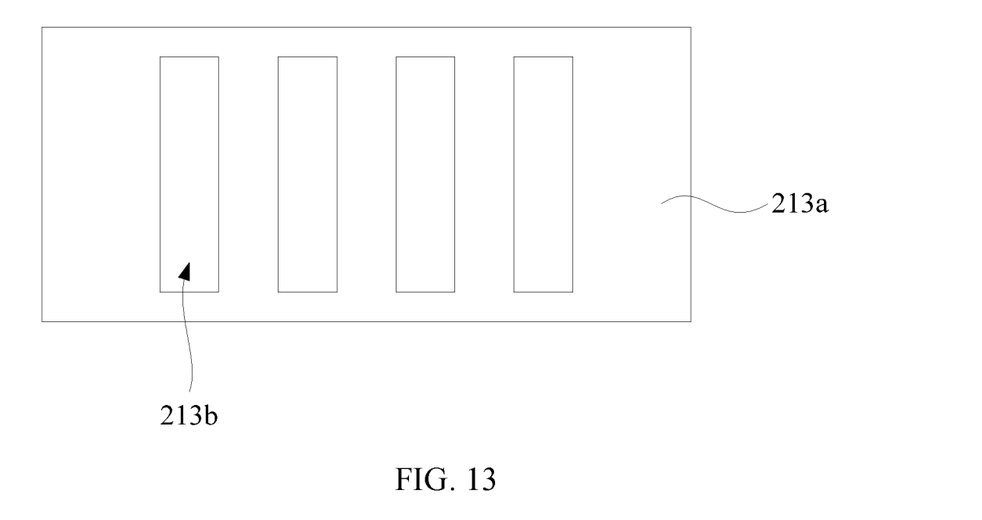
FIG. 13 is a schematic structural diagram of a reflection grating film layer in the optical composite film shown in FIG. 4.

Referring to FIG. 13 together, specifically, the reflection grating film layer 213 includes a transparent substrate 213a and a metal layer 213b.

The transparent substrate 213a is selected from one of the group consisting of a glass substrate, a silica gel substrate, a silicon dioxide substrate, a silicon nitride substrate, a polymethylmethacrylate substrate, and a polyethylene terephthalate substrate.

A plurality of metal layers 213b exist and are strip-shaped, the plurality of metal layers 213b are disposed on the transparent substrate 213a, the plurality of metal layers 213b are evenly arranged at intervals along a straight line, and extension directions of the plurality of metal layers 213b are parallel to each other, to dispose gratings. Optionally, the plurality of metal layers 213b are disposed on a side of the transparent substrate 213a. Specifically, a material of the metal layer 213b is selected from one of gold, aluminum, and copper.

Optionally, the metal layer 213b has a width of 50 nm to 150 nm; the metal layer 213b has a thickness of 100 nm to 200 nm; and a spacing between two neighboring metal layers 213b is 100 nm to 200 nm. Specifically, the plurality of metal layers 213b are rectangular.

Light passes through the reflection grating film layer 213 and may be divided into an electromagnetic wave whose vibration direction is perpendicular to an extension direction of the metal layer 213b and an electromagnetic wave whose vibration direction is parallel to the extension direction of the metal layer 213b. The reflection grating film layer 213 absorbs or reflects an electromagnetic wave component whose electromagnetic wave vibration component is parallel to the extension direction of the metal layer 213b, only an electromagnetic wave component whose electromagnetic wave vibration component is perpendicular to the extension direction of the metal layer 213b penetrates, to obtain a function the same as that of the polarizing plate, and only polarized light perpendicular to a stretching direction of the polarizing plate passes through.

An operating principle of the optical composite film 210 is as follows:

Light consists of horizontally polarized (a vibration direction of an electric field is a direction of 0° or 180°) light and vertically polarized (a vibration direction of the electric field is a direction of 90° or 270°) light, the reflection grating film layer 213 plays a role of absorbing polarized light and allowing polarized light to penetrate, and when an arrangement direction of the metal layer of the reflection grating film layer 213 is parallel to the direction of 90° or 270°, an extension direction of the metal layer of the reflection grating film layer 213 is parallel to the direction of 0° or 180°. It is predicted that vertically polarized light can pass through the reflection grating film layer 213, an equivalent refractive index when the vertically polarized light passes through the optically-uniaxial optical film layer 211 is no, and an equivalent refractive index when the vertically polarized light passes through the substrate layer 212 is ns. Due to a difference between the refractive index of the optically-uniaxial optical film layer 211 and the refractive index of the substrate layer 212 (no is greater than ns), when the vertically polarized light is incident from the optically-uniaxial optical film layer 211 (optically denser medium) to the substrate layer 212 (optically thinner medium), refraction is generated, and an optical phenomenon in which light energy is allocated from the front viewing angle to the large viewing angle occurs.

When the arrangement direction of the metal layer of the reflection grating film layer 213 is parallel to the direction of 0° or 180°, the extension direction of the metal layer of the reflection grating film layer 213 is parallel to the direction of 90° or 270°. It is predicted that horizontally polarized light can pass through the reflection grating film layer 213, an equivalent refractive index when the horizontally polarized light passes through the optically-uniaxial optical film layer 211 is no, and an equivalent refractive index when the horizontally polarized light passes through the substrate layer 212 is ns. Due to a difference between the refractive index of the optically-uniaxial optical film layer 211 and the refractive index of the substrate layer 212 (no is greater than ns), when the horizontally polarized light is incident from the optically-uniaxial optical film layer 211 (optically denser medium) to the substrate layer 212 (optically thinner medium), refraction is generated, and an optical phenomenon in which light energy is allocated from the front viewing angle to the large viewing angle occurs. Therefore, the optical composite film 210 not only can allocate light energy from the front viewing angle to the large viewing angle and improve the viewing angle color shift, but also can turn natural light into polarized light, so as to be in place of the polarizing plate.

The first glass film layer 220 is stacked on the optical composite film 210. Optionally, the first glass film layer 220 is stacked on the reflection grating film layer 213.

The first indium tin oxide film layer 230 is stacked on a side of the first glass film layer 220 away from the optical composite film 210.

The liquid crystal layer 240 is stacked on a side of the first indium tin oxide film layer 230 away from the first glass film layer 220.

The second indium tin oxide film layer 250 is stacked on a side of the liquid crystal layer 240 away from the first indium tin oxide film layer 230.

The metal grating film layer 260 is stacked on a side of the second indium tin oxide film layer 250 away from the liquid crystal layer 240. The metal grating film layer 260 has a function and a material roughly the same as those of the reflection grating film layer 213, to be in place of an upper polarizing plate, and further reduce the thickness of the display panel 200.

The second glass film layer 270 is stacked on a side of the metal grating film layer 260 away from the second indium tin oxide film layer 250.

The photoresist layer 280 is stacked between the metal grating film layer 260 and the second glass film layer 270.

Figure 14:
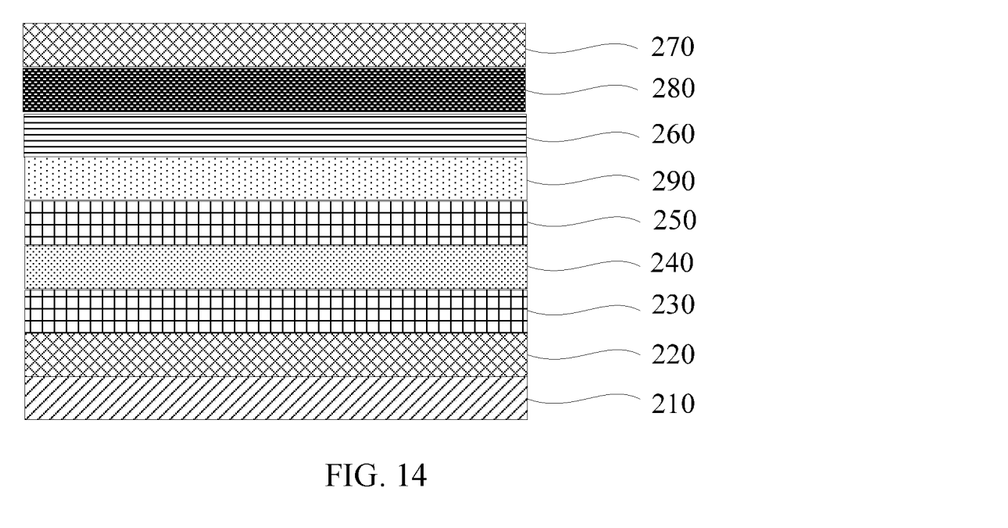
FIG. 14 is a schematic structural diagram of a display panel of another embodiment of the display device shown in FIG. 1.
Figure 15:
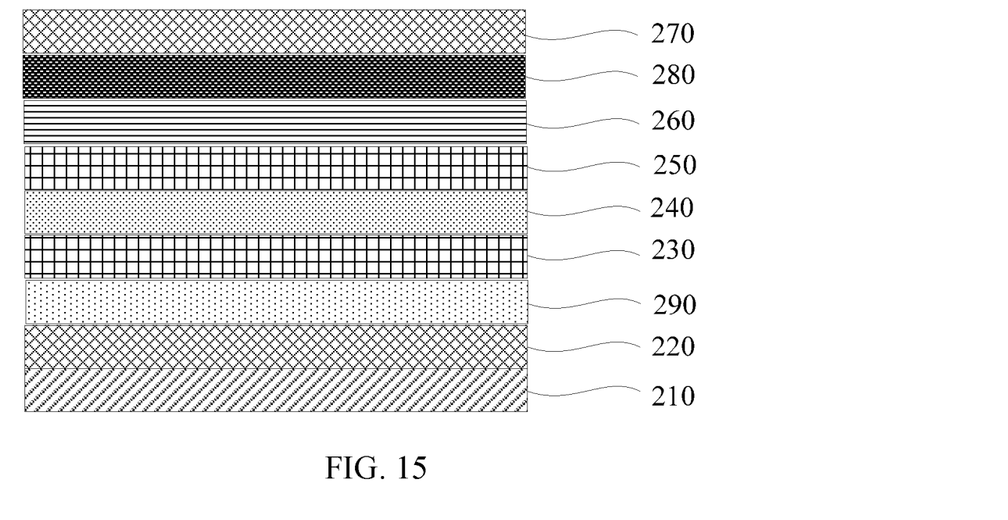
FIG. 15 is a schematic structural diagram of a display panel of another embodiment of the display device shown in FIG. 1.

Referring to FIG. 14 and FIG. 15 together, optionally, the display panel 200 further includes a compensation film layer 290, and the compensation film layer 290 is stacked between the second indium tin oxide film layer 250 and the metal grating film layer 260; or the compensation film layer 290 is stacked between the first glass film layer 220 and the first indium tin oxide film layer 230. The compensation film layer 290 can be in place of an optical function of a compensation film in the polarizing plate. Optionally, the compensation film layer 290 has optical anisotropy. Specifically, a material of the compensation film layer 290 is a nematic-phase liquid crystal molecule material. More specifically, the compensation film layer 290 is prepared by using a process of liquid crystal molecule coating or ultraviolet (UV) light curing.

Figure 16:
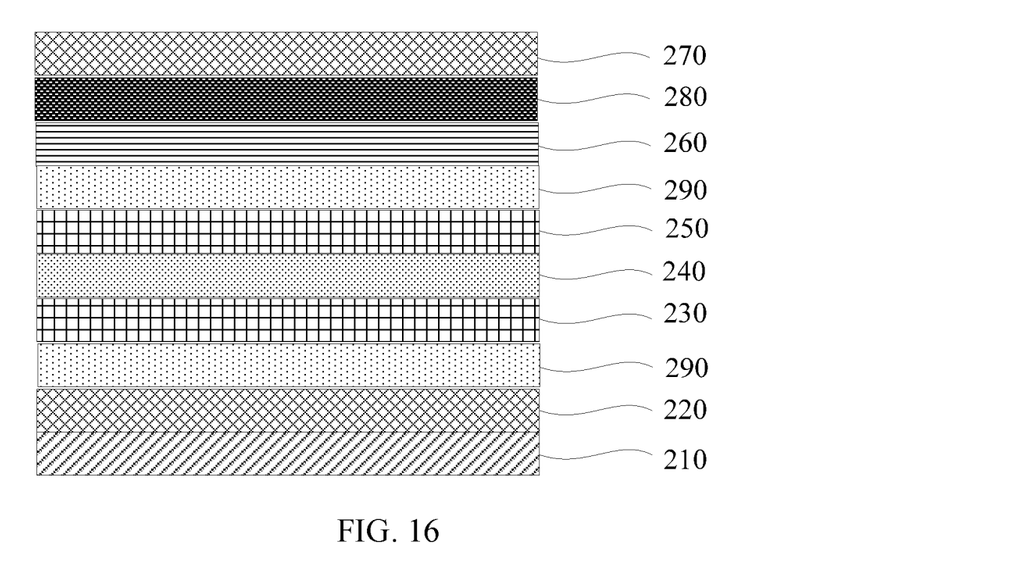
FIG. 16 is a schematic structural diagram of a display panel of another embodiment of the display device shown in FIG. 1.

Referring to FIG. 16 together, in an embodiment, a quantity of compensation film layers 290 is two, one of the two compensation film layers 290 is stacked between the second indium tin oxide film layer 250 and the metal grating film layer 260, and the other of the two compensation film layers 290 is stacked between the first glass film layer 220 and the first indium tin oxide film layer 230.

Figure 17:
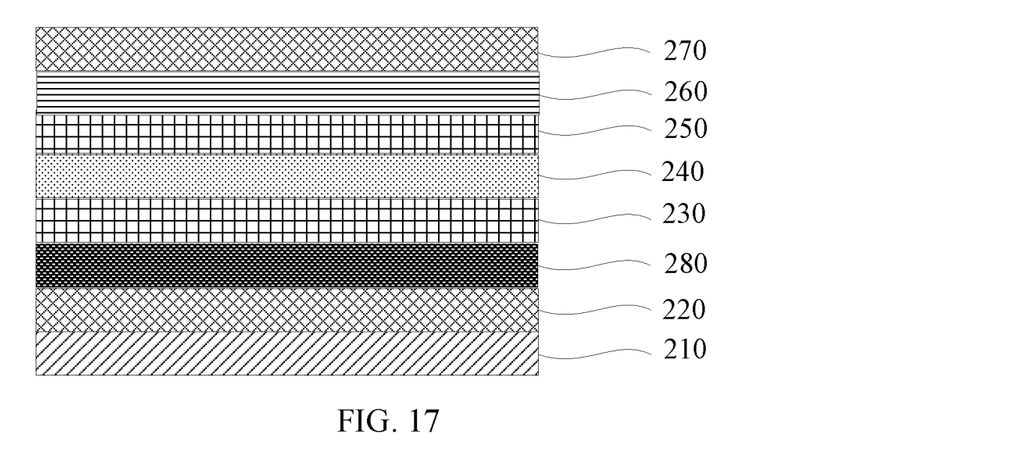
FIG. 17 is a schematic structural diagram of a display panel of another embodiment of the display device shown in FIG. 1.

It should be noted that referring to FIG. 17 together, the display panel 200 is not limited to the foregoing structure, and the photoresist layer 280 of the display panel 200 may be further stacked between the first glass film layer 220 and the first indium tin oxide film layer 230.

Figure 18:
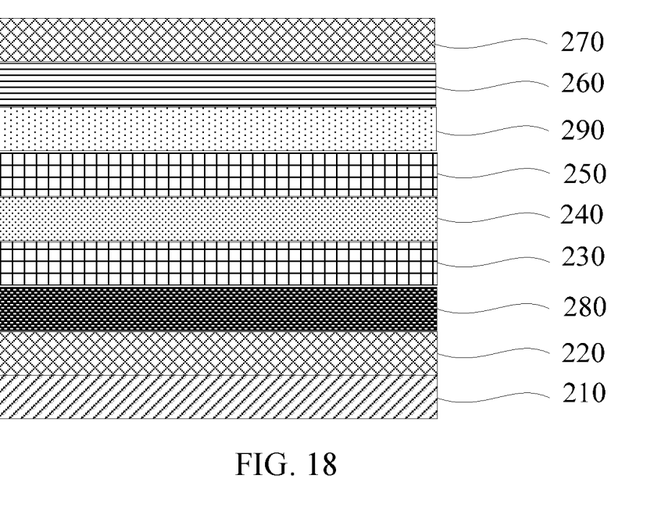
FIG. 18 is a schematic structural diagram of a display panel of another embodiment of the display device shown in FIG. 1.
Figure 19:
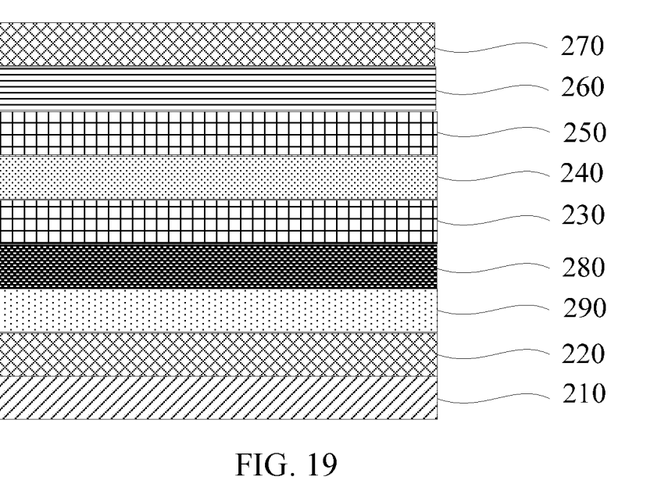
FIG. 19 is a schematic structural diagram of a display panel of another embodiment of the display device shown in FIG. 1.

Referring to FIG. 18 and FIG. 19 together, optionally, the compensation film layer 290 is stacked between the second indium tin oxide film layer 250 and the metal grating film layer 260; or the compensation film layer 290 is stacked between the photoresist layer 280 and the first glass film layer 220.

Figure 20:
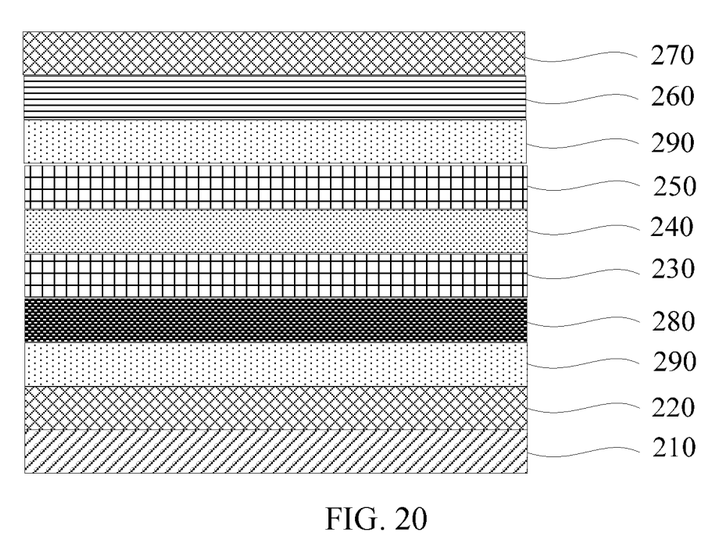
FIG. 20 is a schematic structural diagram of a display panel of another embodiment of the display device shown in FIG. 1.

Referring to FIG. 20 together, in an embodiment, a quantity of compensation film layers 290 is two, one of the two compensation film layers 290 is stacked between the second indium tin oxide film layer 250 and the metal grating film layer 260, and the other of the two compensation film layers 290 is stacked between the photoresist layer 280 and the first glass film layer 220.

It should be noted that the display panel 200 is not limited to the foregoing stacking structure, and materials having special functions may be added to different film layers according to different requirements. For example, another function material is added to a single-function film layer, to obtain a multifunction film layer. In addition, an order of stacking film layers in the display panel 200 may be changed according to a required function, and another function film layer and the like may be further added according to a requirement.

The foregoing display device 10 has at least the following advantages:

1. The foregoing optically-uniaxial optical film layer 211 includes a plate-shaped portion 211a and a plurality of refraction portions 211b disposed on a side of the plate-shaped portion 211a, the plurality of refraction portions 211b are camber columns or quadrangular prisms, a material of the optically-uniaxial optical film layer 211 is a dish-shaped liquid crystal molecule material, the substrate layer 212 is stacked on a side of the plate-shaped portion 211a close to the refraction portion 211b, and the ordinary light refractive index of the optically-uniaxial optical film layer 211 is greater than the refractive index of the substrate layer 212. When light is incident from the optically-uniaxial optical film layer 211 to the substrate layer 212, due to a difference between refractive indexes, the light is incident from an optically denser medium to an optically thinner medium and a refraction phenomenon occurs, to allocate light energy from the front viewing angle to the large viewing angle, and resolve a problem of color shift of the display panel 200 at the large viewing angle. Moreover, the reflection grating film layer 213 is disposed on a side of the substrate layer 212 away from the optically-uniaxial optical film layer 211, and the reflection grating film layer 213 can turn natural light into polarized light, and is in place of a relatively thick polarizing plate, to make the display panel 200 relatively thin. Therefore, the foregoing optical composite film 210 not only can alleviate the color shift of the display panel 200 at the large viewing angle, but also can make the display panel 200 relatively thin.

2. In the display panel 200, RGB sub-pixels do not need to be divided into a primary pixel structure and a secondary pixel structure, to avoid design of metal wiring or a TFT element to drive the secondary pixel, which would cause a sacrifice in an opening region of transmissible light and affect a transmission rate of the panel. Moreover, display resolution and driving frequency of the display panel 200 are maintained. Therefore, the foregoing optical composite film 210 can improve the viewing angle color shift, and the panel has a relatively good transmission rate.

3. The reflection grating film layer 213 of the foregoing display panel 200 is in place of a lower polarizing plate, and the metal grating film layer 260 is in place of an upper polarizing plate, to make the display panel 200 relatively thin.

It should be understood that the application of this application is not limited to the above examples, and a person skilled in the art can make improvements and modifications in accordance to the above descriptions, and all such improvements and modifications shall fall within the protection scope of the appended claims.

What is claimed is:

1. An optical composite film, comprising:
   an optically-uniaxial optical film layer, including a plate-shaped portion and a plurality of refraction portions disposed on a side of the plate-shaped portion, wherein the plurality of refraction portions are selected from one type of camber columns and quadrangular prisms, and when the plurality of refraction portions are the camber columns, the refraction portion has a plurality of side surfaces, one of the plurality of side surfaces is an arc-shaped convex surface, and a side surface of the refraction portion away from the arc-shaped convex surface is in contact with the plate-shaped portion; and when the plurality of refraction portions are the quadrangular prisms, a side surface of the refraction portion is in contact with the plate-shaped portion, wherein a material of the optically-uniaxial optical film layer is a dish-shaped liquid crystal molecule material;
   a substrate layer, stacked on a side of the plate-shaped portion close to the refraction portion, wherein the plurality of refraction portions are accommodated in the substrate layer, and an ordinary light refractive index of the optically-uniaxial optical film layer is greater than a refractive index of the substrate layer; and
   a reflection grating film layer, disposed on a side of the substrate layer away from the optically-uniaxial optical film layer.

2. The optical composite film according to claim 1, wherein the substrate layer is a transparent optical film layer having optical isotropy.

3. The optical composite film according to claim 1, wherein the substrate layer is selected from one of the group consisting of a polymethylmethacrylate layer, a polyethylene terephthalate layer, a cyclic olefin polymer layer, a cellulose triacetate film, a polyimide film, a silicon dioxide layer, a silicon nitride layer, and a glass plate layer.

4. The optical composite film according to claim 1, wherein the ordinary light refractive index of the optically-uniaxial optical film layer is 1.0 to 2.5.

5. The optical composite film according to claim 1, wherein the refractive index of the substrate layer is 1.0 to 2.5.

6. The optical composite film according to claim 1, wherein a difference between the ordinary light refractive index of the optically-uniaxial optical film layer and the refractive index of the substrate layer is 0.01 to 2.

7. The optical composite film according to claim 1, wherein the plurality of refraction portions are the camber columns, the plurality of refraction portions are arranged along a straight line, and extension directions of the plurality of refraction portions are parallel.

8. The optical composite film according to claim 1, wherein the plurality of refraction portions are the camber columns, the plurality of refraction portions are arranged in a two-dimensional matrix, and two neighboring refraction portions are disposed at an interval.

9. The optical composite film according to claim 1, wherein the plurality of refraction portions are the quadrangular prisms, the plurality of refraction portions are arranged along a straight line, extension directions of the plurality of refraction portions are parallel, and two neighboring refraction portions are disposed at an interval.

10. The optical composite film according to claim 1, wherein the plurality of refraction portions are the quadrangular prisms, the plurality of refraction portions are arranged in a two-dimensional matrix, and two neighboring refraction portions are disposed at an interval.

11. The optical composite film according to claim 1, wherein the reflection grating film layer comprises a transparent substrate and a plurality of strip-shaped metal layers disposed on the transparent substrate, the plurality of metal layers are evenly arranged at intervals along a straight line, and extension directions of the plurality of metal layers are parallel to each other.

12. The optical composite film according to claim 1, wherein a material of the optically-uniaxial optical film layer is a dish-shaped liquid crystal molecule material, the ordinary light refractive index of the optically-uniaxial optical film layer is 1.0 to 2.5, the refractive index of the substrate layer is 1.0 to 2.5, and a difference between the ordinary light refractive index of the optically-uniaxial optical film layer and the refractive index of the substrate layer is 0.01 to 2.

13. A display panel, comprising the optical composite film according to claim 1, a first glass film layer, a first indium tin oxide film layer, a liquid crystal layer, a second indium tin oxide film layer, a metal grating film layer, a second glass film layer, and a photoresist layer, wherein the reflection grating film layer, the first glass film layer, the first indium tin oxide film layer, the liquid crystal layer, the second indium tin oxide film layer, the metal grating film layer, and the second glass film layer are sequentially stacked, and the photoresist layer is stacked between the metal grating film layer and the second glass film layer, or the photoresist layer is stacked between the first glass film layer and the first indium tin oxide film layer.

14. The display panel according to claim 13, wherein the photoresist layer is stacked between the metal grating film layer and the second glass film layer, the display panel further comprises a compensation film layer, and the compensation film layer is stacked between the second indium tin oxide film layer and the metal grating film layer.

15. The display panel according to claim 13, wherein the photoresist layer is stacked between the metal grating film layer and the second glass film layer, the display panel further comprises a compensation film layer, and the compensation film layer is stacked between the first glass film layer and the first indium tin oxide film layer.

16. The display panel according to claim 13, wherein the photoresist layer is stacked between the metal grating film layer and the second glass film layer, the display panel further comprises compensation film layers, a quantity of the compensation film layers is two, one of the two compensation film layers is stacked between the second indium tin oxide film layer and the metal grating film layer, and the other is stacked between the first glass film layer and the first indium tin oxide film layer.

17. The display panel according to claim 13, wherein the photoresist layer is stacked between the first glass film layer and the first indium tin oxide film layer, the display panel further comprises a compensation film layer, and the compensation film layer is stacked between the second indium tin oxide film layer and the metal grating film layer.

18. The display panel according to claim 13, wherein the photoresist layer is stacked between the first glass film layer and the first indium tin oxide film layer, the display panel further comprises a compensation film layer, and the compensation film layer is stacked between the photoresist layer and the first glass film layer.

19. The display panel according to claim 13, wherein the photoresist layer is stacked between the first glass film layer and the first indium tin oxide film layer, the display panel further comprises compensation film layers, a quantity of the compensation film layers is two, one of the two compensation film layers is stacked between the second indium tin oxide film layer and the metal grating film layer, and the other is stacked between the photoresist layer and the first glass film layer.

20. A display device, comprising a backlight source and the display panel according to claim 13, wherein the backlight source is located on a side of the display panel.

\* \* \* \* \*